(12) United States Patent
Wong et al.

(10) Patent No.: US 10,353,867 B1
(45) Date of Patent: Jul. 16, 2019

(54) METHOD AND SYSTEM FOR VERIFYING FILES FOR GARBAGE COLLECTION

(71) Applicant: EMC Corporation, Hopkinton, MA (US)

(72) Inventors: Tony Wong, Milpitas, CA (US); Abhinav Duggal, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 416 days.

(21) Appl. No.: 15/194,327

(22) Filed: Jun. 27, 2016

(51) Int. Cl.
    *G06Q 10/06* (2012.01)
    *G06F 16/17* (2019.01)
    *G06F 16/16* (2019.01)

(52) U.S. Cl.
    CPC ........ *G06F 16/1727* (2019.01); *G06F 16/162* (2019.01)

(58) Field of Classification Search
None
See application file for complete search history.

(56) References Cited

U.S. PATENT DOCUMENTS

| | | | | |
|---|---|---|---|---|
| 9,367,448 | B1* | 6/2016 | Botelho | G06F 12/0253 |
| 9,715,505 | B1* | 7/2017 | Mondal | G06F 17/30138 |
| 2009/0254572 | A1* | 10/2009 | Redlich | G06Q 10/06 |

* cited by examiner

*Primary Examiner* — Wilson Lee
(74) *Attorney, Agent, or Firm* — Womble Bond Dickinson (US) LLP (57) ABSTRACT

According to one embodiment, fingerprints of segment trees are scanned, each segment tree representing one of the files in a filesystem namespace. For each of the fingerprints representing a segment, setting a corresponding bit in a live reference vector (LRV) to indicate that the segment has been referenced by a file in the filesystem namespace. A file index mapping fingerprints to storage locations of segments is scanned, including, for each fingerprint found in the file index, setting a corresponding bit in a live index vector (LIV) to indicate that the fingerprint exists in the file index. The LR vector and the LI vector are compared to determine whether there is any mismatch. A garbage collection operation is performed in response to determining that the LR vector and the LI vector are matched.

21 Claims, 6 Drawing Sheets

METHOD AND SYSTEM FOR VERIFYING FILES FOR GARBAGE COLLECTION

FIELD OF THE INVENTION

Embodiments of the present invention relate generally to deduplicated data storage systems. More particularly, embodiments of the invention relate to verifying files for garbage collection.

BACKGROUND

In a deduplicated storage system, files are stored in a form of deduplicated segments. Segments are stored inside containers, segment references are stored inside the metadata segments and index stores the mapping from fingerprints to container identifiers (IDs) identifying the containers. A segment is called a live segment and a segment reference is called a live reference if they can be reached from the file system's directory name space. The two conditions must hold: 1) the file system maintains a one to one mapping between the (segment, container) pair and the index; and 2) by virtue of the definition of live reference, the segment should exist if there is a live reference to that segment, otherwise there is data loss.

Inconsistency between the index, segments, and their references can occur in the file system due to hardware or software bugs. The file system automatically performs logical file verification whenever a file is closed after write operations. It traverses the metadata (e.g., segment tree) in a depth first manner to verify the above conditions. In addition to the logical file verification procedure, the file system also periodically computes the entire index checksum and compare against the segment checksum. The file system also computes the checksum of all the live references at each segment tree and then it compares against the checksum of all the segments referenced in the next segment tree level (e.g., child level). However, the file system does not have enough memory to include the actual data segments in this procedure.

There are also other means to catch data corruption, e.g. replication, locality repair, or direct user access. These are not 100% reliable mechanisms as they might not even be enabled at all and we cannot rely on them. Logical file verification traverses the segment tree of a file and verifies the consistency in a file by file basis. This segment tree depth first approach can result in very slow random disk input and output (TO). Furthermore, duplication can cause file verification to walk the same segments over and over again. Because of these issues, the current file verification can lag behind by weeks or even months.

To verify the second condition above, it is possible to enumerate all the live segment references and the segments but they might not all fit into available memory. This document describes an in-memory only solution that can fulfill requirement #2 with high probability.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, instead of comparing the live reference against the segments, the index is utilized. It is much faster to read from the index than reading from the segment containers. There should be a one to one mapping between the (segment, container) pair and the index. A bloom filter (referred to as a live reference bloom filter) is created to track all the live references and another bloom filter (referred to as a live index bloom filter) is created to track the live fingerprints in the index. The live reference bloom filter is also called the live vector and the live index bloom filter is also called the live index vector. They will be sized equally for fast comparison and use same hash functions. Accordingly, they will have the same bits if the live references and the live fingerprints in the index are the same. The error rate of a bloom filter is determined by the number of bits used to represent each sample data, e.g. if there are 6 bits for each sample and 4 hash functions are used, the error rate (false positive rate) of the bloom filter is about 7%. If there is not enough memory to track the entire sample set and keep the error rate below some desirable threshold at the same time, the only alternative is to verify only a subset of the fingerprints called the sample set. Anything not in the sample set will be discarded. Once the sample set is determined, the live segment references are read in a breadth first manner, starting from the top level of a segment tree. All the live references are inserted into the live vector. Then the index is read in a sequential manner. If the index is also found in the live reference, it will be inserted into the live index bloom filter.

According to one embodiment, fingerprints of segment trees are scanned, each segment tree representing one of the files in a filesystem namespace. For each of the fingerprints representing a segment, setting a corresponding bit in a live reference vector (LRV) to indicate that the segment has been referenced by a file in the filesystem namespace. A file index mapping fingerprints to storage locations of segments is scanned, including, for each fingerprint found in the file index, setting a corresponding bit in a live index vector (LIV) to indicate that the fingerprint exists in the file index. The LR vector and the LI vector are compared to determine whether there is any mismatch. A garbage collection operation is performed in response to determining that the LR vector and the LI vector are matched.

Figure 1:
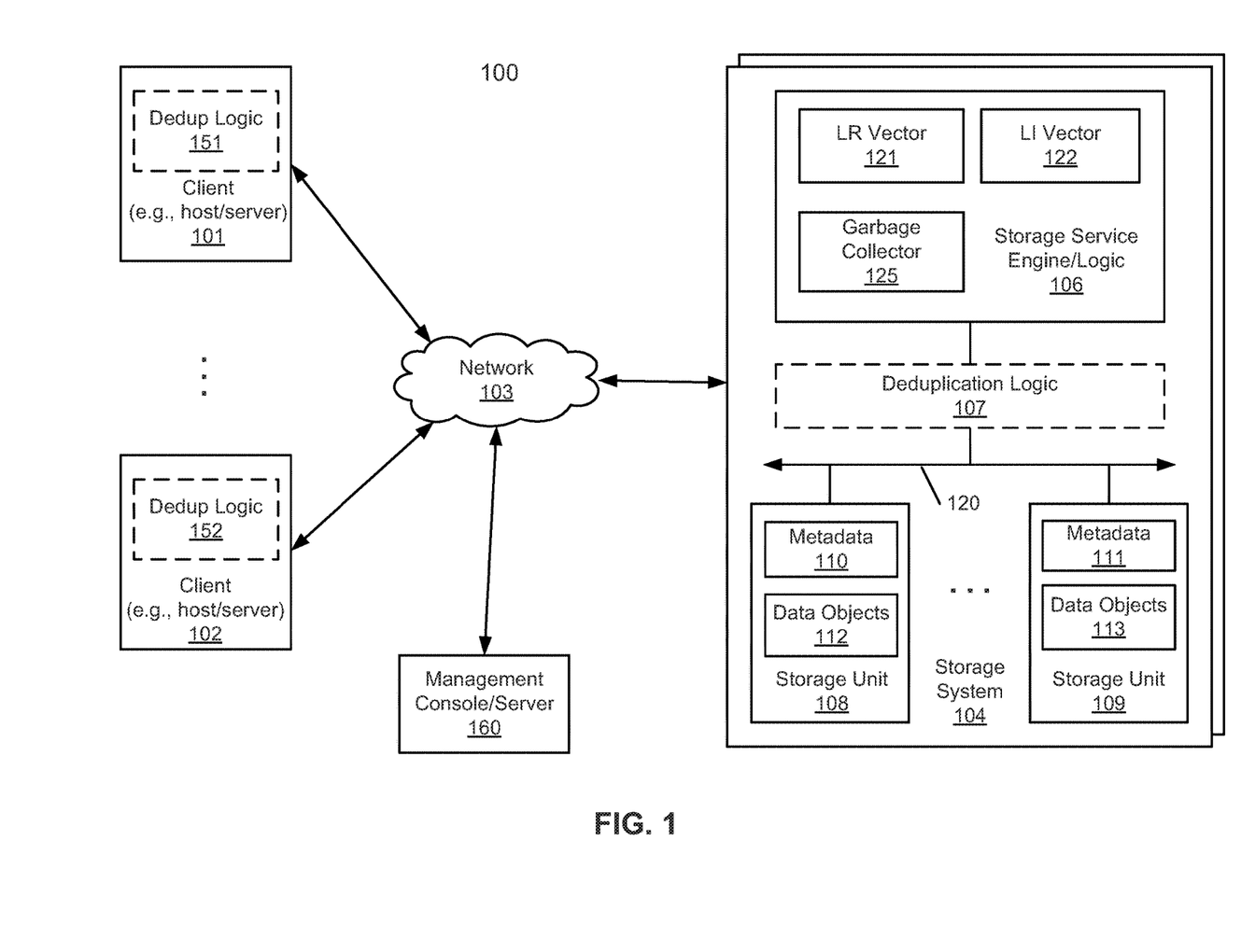
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic and restore logic (not shown). The backup logic is configured to receive and back up data from a client (e.g., clients 101-102) and to store the backup data in any one or more of storage units 108-109. The restore logic is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

According to one embodiment, storage engine 106 further includes garbage collector or garbage collection module 125 to perform a garbage collection process to reclaim any storage space that is not utilized or referenced by the file system. Garbage collector 125 performs a garbage collection process based on segments of a file system namespace on a breadth-first approach. In the breadth-first approach, the segments are traversed on a level-by-level manner, from a top level (also referred to as a root level or top parent level) to a bottom level, physically instead of on a file-by-file basis. Each segment may be traversed once even through such a segment may be referenced or shared by multiple files.

During the traversal of the segments, each segment (represented by a fingerprint) that is deemed to be alive is marked in live reference (LR) vector 121 indicating that the corresponding segment is alive. In addition garbage collector 125 scans a file index (not shown). For any segment found in the index, the segment is marked in a live index (LI) vector 122 to indicate that the segment is referenced by the index. If there is any mismatch or discrepancy between the LR vector and LI vector, there may be at least one segment missing. In such a scenario, a further verification process (e.g., physical scanning of containers) needs to be performed, which may take longer time and consume more resources. However, such a method can quickly determine whether there is any segment missing by comparing the LI and LR vectors. The physical scanning of the containers is performed only if there is a mismatch between the LI and LR vectors.

In one embodiment, since there may be a very large amount of files or segments stored in the storage system, which may be an archive or backup storage system, the file verification process can be performed on a per batch basis (e.g., one set of segments or files at a time). The number of segments or files to be processed at a time can be configured based on the available processing resources (e.g., processor, memory) at the time. For example, a file verification process can be performed a set of predetermined containers at a time to reduce the memory requirement for scanning.

In one embodiment, once the set of segments or files is determined for the current iteration, an LR bloom filter and an LI bloom filter are created, for example, based on the fingerprints of the segments, where the fingerprints may be retrieved from the corresponding container(s). The LR bloom filter and the LI bloom filter are utilized to update or set the LR vector and LI vector, respectively. In general, since the collision rate of a bloom filter is relatively low, by comparing the LR vector and the LI vector manipulated by the corresponding bloom filters, it can be likely certain whether there is any fingerprint and/or actual data segment missing, without having to issue IO requests to the storage containers separately. In other words, if there is a segment indicated in both the LR vector and the LI vector, it is likely that the physical data segment exists.

Figure 2:
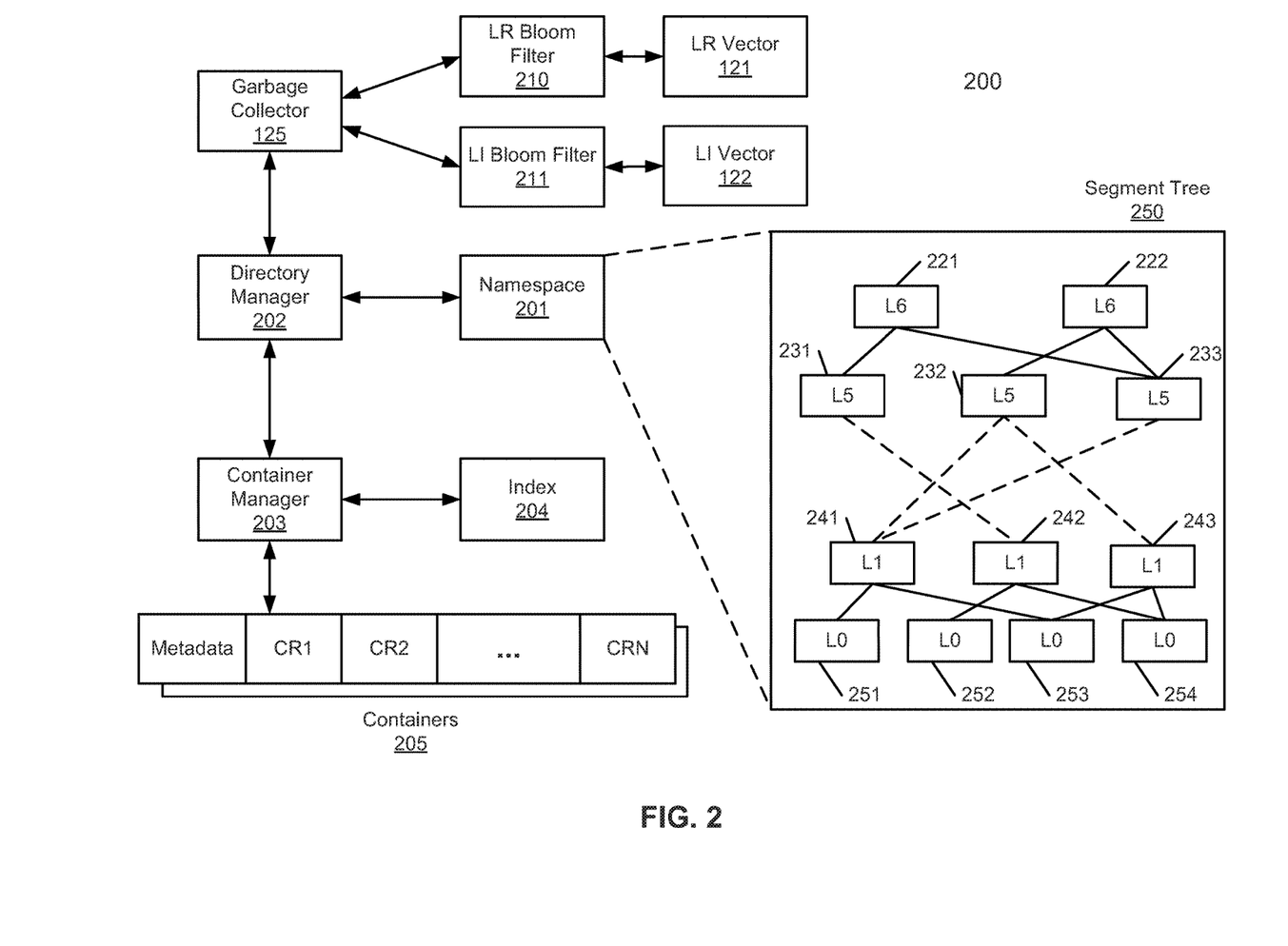
FIG. 2 is a block diagram illustrating a storage system according to one embodiment of the invention.

FIG. 2 is a block diagram illustrating a storage system according to one embodiment of the invention. System 200 may be implemented as part of storage system 104 of FIG. 1. Referring to FIG. 2, garbage collector 125 traverses namespace 201 via directory manager 202, where directory manager 202 is configured to manage files stored in a file system of the storage system. In a deduplicated file system, a file may be represented in a file tree (also referred to as a segment tree) having one or more levels of segments in a multi-level hierarchy. In this example, there are seven levels L0 to L6, where L6 is the root level, also referred to as a top parent level. More or fewer levels may be applied herein. Each upper level contains one or more references to one or more lower level segments. In one embodiment, an upper level segment contains a fingerprint (e.g., metadata) of fingerprints of its child level segments. Only the lowest level segments are the actual data segments containing the actual deduplicated segments. Thus, L1 to L6 are segments only contain metadata of their respective child segments(s), referred to herein as LP segments.

In one embodiment, when garbage collector 125 traverses namespace 201 via directory manager 202, it obtains the fingerprints of the root level segments, in this example, L6 segments, as part of content handles from namespace 201. Based on the fingerprints of the current level segments, container manager 203 can identify which of the containers 205 in which the segments are stored based on indexing information from index 204. Index 204 may be maintained in the system memory (e.g., volatile memory) and/or in a storage device (e.g., non-volatile memory). Index 204 includes information mapping a fingerprint to a storage location that stores a segment represented by the fingerprint. In one embodiment, index 204 may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on. Throughout this application, for the purpose of illustration, a container contains one or more compression regions and each compression region contains one or more segments therein. However, the techniques may also be applied to other storage layouts.

Referring back to FIG. 2, in one embodiment, there are two components responsible to manage the files in the system. The first one is directory manager 202, which is a hierarchical mapping from the path to the inode representing a file. The second one is a content store (not shown), which manages the content of the file. Each file has a content handle (CH) that is stored in the inode that is created by content store every time the file content changes. Each CH represents a file that is abstracted as a file tree (e.g., a Merkle tree or Mtree) of segments. In this example, a file tree can have up to 7 levels: L0, . . . , L6. The L0 segments represent user data (e.g., actual data) and are the leaves of the tree. The L6 is the root of the segment tree. Segments from L1 to L6 are referred to as metadata segments or LP segments. They represent the metadata of the file. An L1 segment is an array of L0 references. Similarly an L2 is an array of L1 references and so on. A segment is considered live if it can be referenced by any live content in the file system.

The file system packs the segments into containers 205 which are written to a disk in a log-structured manner. The log-structured container set has a log tail and a log head. New containers are always appended at the head of the log. Each container is structured into sections. The first section is the metadata section and the following sections are compression regions. A compression region is a set of compressed segments. In the metadata section all the references or fingerprints that identify the segments in the container. The metadata further includes information identifying a content type, which describes the content of the container. For instance, it describes which compression algorithm has been used, which type of segments the container has (L0, . . . , L6), etc. Container manager 203 is responsible to maintain the log-structured container set and provide a mapping from container identifiers (CID) to block offset on disk. This mapping may be maintained in memory. It also contains additional information, e.g., the content type of each container.

In the example as shown in FIG. 2, segment 221 of segment tree 250 includes a fingerprint of fingerprints of segments 231 and 233, and segment 222 includes a representation (e.g., a fingerprint) of fingerprints of segments 232-233, and so on. Some of the segments, such as segment 233, are referenced shared by multiple parent level segments (e.g., segments 221-222). Thus, segments 221-222, 231-233, and 241-243 only contain data representing the metadata of their respective child segments. Only segments 251-254 contain the actual user data.

A conventional garbage collection process typical traverses the segments in a depth-first or a file-by-file manner. For example, assuming segment 221 is associated with a first file while segment 222 is associated with a second file, the garbage collector will have to traverses a first file by scanning segment 221 and then segments 231 and 233, and so on. After the first file has been processed, the garbage collector will process the second file by scanning segment 222 and then segments 232-233, and so on. Thus, segment 233 will be processed at least twice in this example. If there are more files stored in the storage system, there are more segments that will be shared or referenced by multiple files and the processing of the same segments will be repeatedly performed. Thus, the time to perform the garbage collection depends on the size of namespace 201, which depends on the fragmentation of the metadata on disk. The more fragmented the metadata is the more costly it is to read segments from the file from disk.

Figure 3:
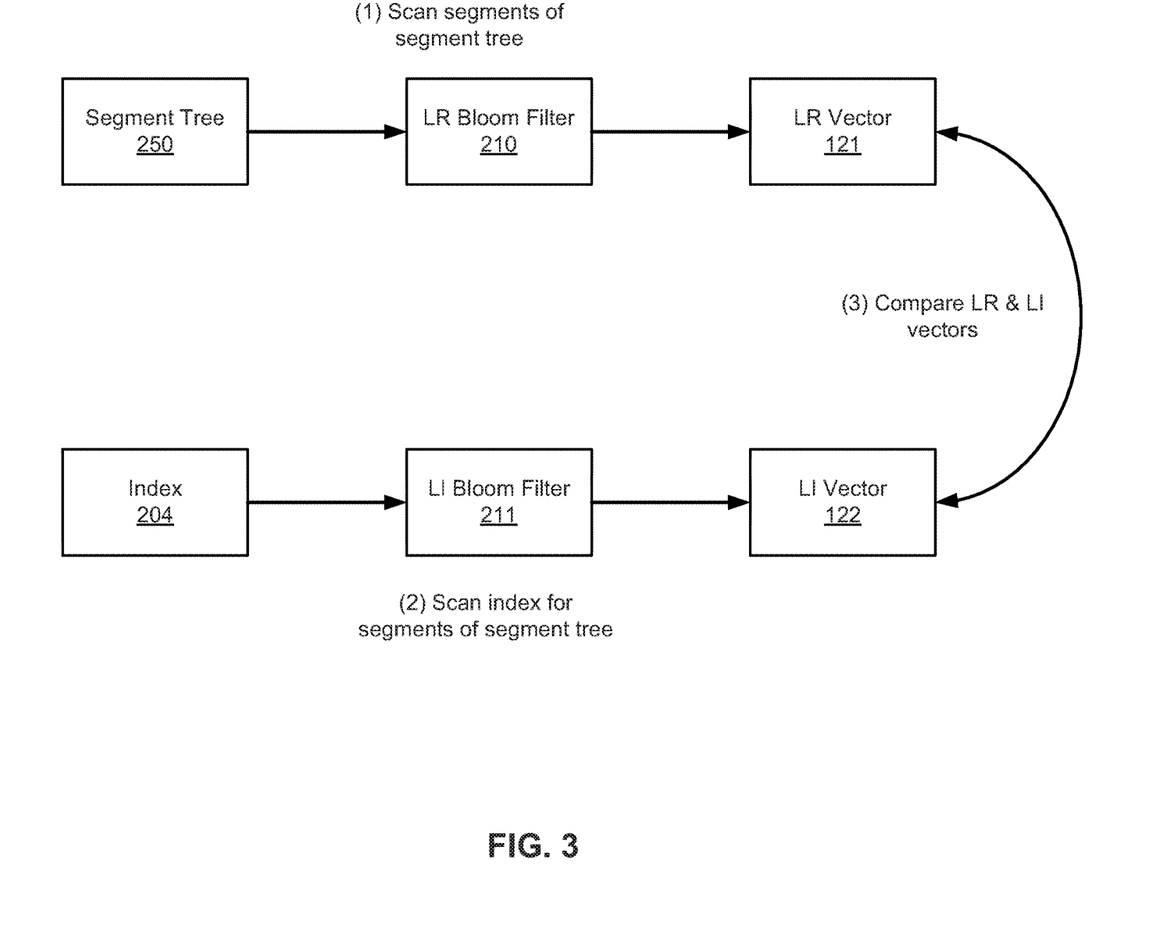
FIG. 3 is a processing flow diagram illustrating a processing flow of verifying files according to one embodiment of the invention.

According to one embodiment, instead of traversing namespace 201 based on a file-by-file basis or a depth-first manner, garbage collector 125 traverses the physical segments in a breadth-first or level-by-level basis. Referring now to FIGS. 2-3, garbage collector 125 starts with the root level, in this example, L6 segments 221-222. For each of the segments found in namespace 201, regardless which file or files the segment is associated with, LR vector 121 is updated or marked to indicate that the corresponding segment is alive. In addition, according to one embodiment, index 204 is scanned by garbage collector 125 to identify any fingerprint and insert the fingerprints obtained from index 204 into LI vector 122. A fingerprint may be inserted into LI vector 122 if the fingerprint is found in LR vector.

LR vector 121 may be a bitmap including multiple bits, each corresponding to one of the live segments found in namespace 201. Similarly, LI vector 122 may be a bitmap having multiple bits, each bit corresponding to one of the segments found in index 204. In one embodiment, LR vector 121 may be updated by applying a corresponding LR bloom filter 210 to the fingerprints. LR bloom filter 210 is specifically created for the set of segments or files in the current iteration. Each iteration only covers a set of predetermined number of segments or files dependent upon the available system memory and other processing resources. Likewise, LI vector 122 may be updated by applying a corresponding LI bloom filter 211 to the fingerprints. The LI bloom filter 211 may be specifically created for the set of segments or files in the current iteration.

After LR vector 121 and LI vector 122 have been populated for all segments in the current iteration, LR vector 121 and LI vector 122 are compared to determine whether there is any mismatch. If there is any mismatch, it is likely that at least one segment is missing. In such a situation, it warrants a physical scan of the containers to identify and verify the missing segments. Any missing files can then be recovered based on the physical scanning.

The error rate of a bloom filter is determined by the number of bits used to represent each sample data, e.g. if there are 6 bits for each sample and 4 hash functions are used, the error rate (false positive rate) of the bloom filter is about 7%. If there is not enough memory to track the entire sample set and keep the error rate below some desirable threshold at the same time, the only alternative is to verify only a subset of the fingerprints called the sample set.

In one embodiment, based on available system memory, the system determines the maximum number of sample data each bloom filter can support for the given iteration. It also computes the sample rate=(max number of sample data)/(total number of data) and round it down if necessary. A mask for the sample set may be generated and only fingerprints in the sample set will be considered for the current iteration. The system then iterates all the files in the name space and insert the L6 references into the live vector. The system then iterate all the L6 containers. If the container fingerprint is set in the live vector, it reads all its contents (L5 segment references) and insert them into the live reference vector and repeats the same process for L5 containers, L4, L3, ... until L1. The creation of the LR vector is completed. After the LR vector is created, the system iterates the index sequentially. If a fingerprint is present in the live vector, the fingerprint is inserted into the LI vector.

The above procedure cannot cover all the segments in the system in one iteration. For example, if the sample rate is ¼, it will take 4 iterations before it can verify all the fingerprints. If the false positive rate of the bloom filters is 7%, only 93% of the data is verified after 4 iterations. Typical data corruption occurs at a much larger granularity than just one specific fingerprint. For example, assuming a sample rate of ¼ and n segments in the same file are corrupted, the probability that at least one of them is in the sample set is $=1-(¾)^n$. If n=16, this probability is equal to 0.99. As the number of corrupted segments increases, the probability also increases quickly to 1.

If there is a mismatch in the bloom filters, there must be some missing fingerprints in the index. It is not possible to tell which fingerprints are missing from the bloom filter. The containers must be scanned again to check which fingerprints are set in the live filter but not in the live index vector. The missing fingerprints will be inserted into a hash table called the missing segment table. If the missing segment table is not empty, a reverse physical segment level scan (from L1 to L6) will be performed and the LP segment fingerprint will be inserted into the same hash table if that LP segment contains any of the fingerprints in the hash table.

Once all the candidate L6's have been identified, the directory tree will be scanned to locate the missing user files. Missing fingerprints can also collide with live fingerprints in a bloom filter. Not all of them can be detected in this procedure. Other procedure, e.g. logical file verification, can be invoked to do a more comprehensive verification. However, if there are multiple blocks corruption in any file, this probabilistic file verification algorithm will be able to identify those corrupted files with very high probability.

There are several advantages for the techniques described throughout this application. The data structures used in the algorithm all fit into the available memory. Segment trees are scanned level by level which will not suffer any performance issues caused by random IO in certain workloads. The efficiency of the algorithm allows the procedure to complete in a short time. This can be used as the base mechanism of system wide verification for all types of workloads. Even at low sample rate, e.g. ¼, this procedure has very high probability of catching multiple segment corruptions. In a conventional system, once a file has been verified, it is not checked again. It is possible that segments are moved around by the file system which can result in corruption. The probabilistic file verification method described according to certain embodiments can reduce this kind of corruption.

Figure 4:
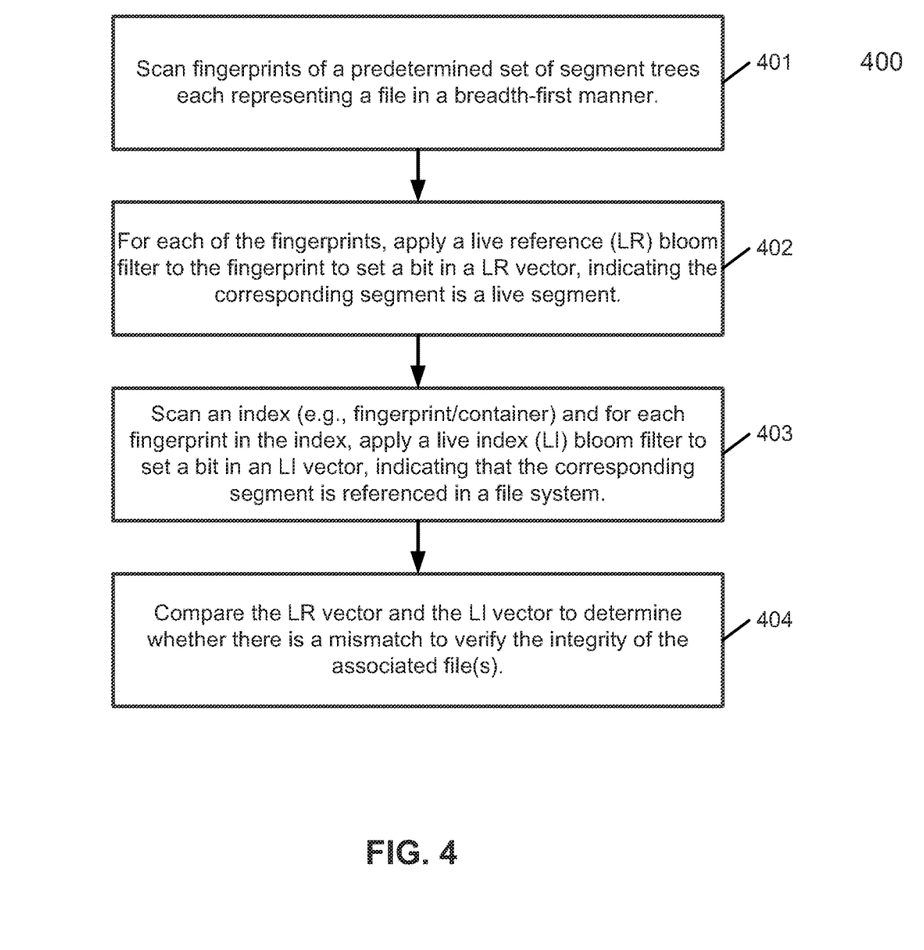
FIG. 4 is a flow diagram illustrating a process of verifying files according to one embodiment of the invention.

FIG. 4 is a flow diagram illustrating a process of verifying files according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by garbage collector 125 of FIG. 1. Referring to FIG. 4, at block 401, processing logic scans fingerprints of a predetermined set of segments or files in a breadth-first approach. For each of the fingerprints, at block 402, processing logic applies a LR bloom filter to the fingerprint to set a bit in an LR vector, indicating that the corresponding segment is a live segment. At block 403, processing logic scans an index (e.g., fingerprint to container index) and for each fingerprint found in the index, processing logic applies a LI bloom filter to set a bit in an LI vector to indicate that the segment is referenced by the index. At block 404, the LR vector and the LI vector is compared to determine whether there is a mismatch.

Figure 5:
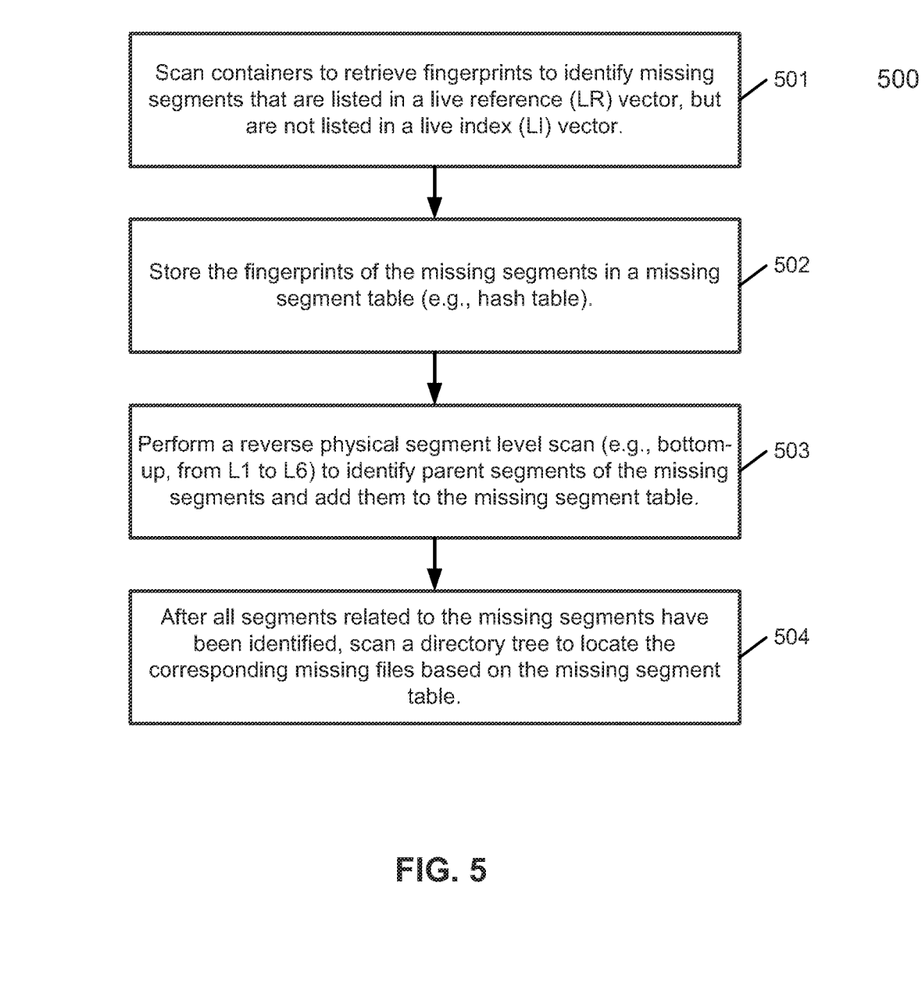
FIG. 5 is a flow diagram illustrating a process of verifying files according to another embodiment of the invention.

FIG. 5 is a flow diagram illustrating a process of verifying files according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by garbage collector 125 of FIG. 1. Referring to FIG. 5, at block 501, processing logic scans containers to retrieve fingerprints to identify missing segments that are listed in an LR vector, but are absent from an LI vector. At block 502, the fingerprints of the missing segments are stored in a missing segment table. At block 503, perform a reverse segment scan (e.g., bottom-up, from L1 to L6) to identify any parent segments of the missing segments in the missing segment table and to add those parent segments in the missing segment table. After all segments that are related to the missing segments have been identified in the missing segment table, processing logic scans the directory namespace to locate any missing files corresponding to the missing segments in the missing segment table.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
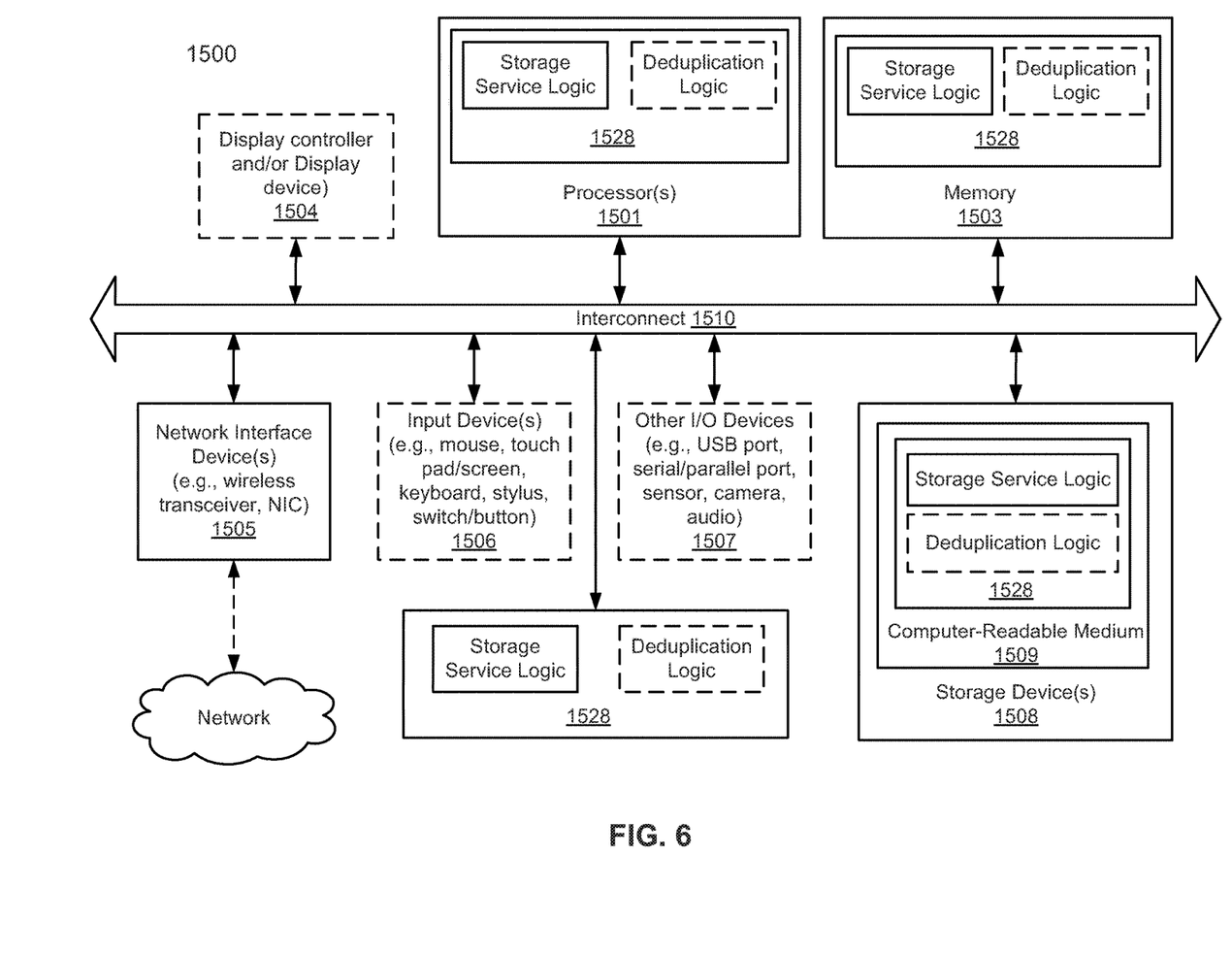
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above, such as, for example, clients 101-102 and servers 104 and 160 of FIG. 1.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for verifying files for garbage collection, the method comprising:
    scanning fingerprints of a plurality of segment trees, each segment tree representing one of a plurality of files in a filesystem namespace;
    for each of the fingerprints representing a segment, setting a corresponding bit in a live reference (LR) vector to indicate that the segment has been referenced by a file in the filesystem namespace;
    scanning a file index mapping fingerprints to storage locations of a plurality of segments, including, for each fingerprint found in the file index, setting a corresponding bit in a live index (LI) vector to indicate that the fingerprint exists in the file index;
    comparing the LR vector and the LI vector to determine that the LR vector and the LI vector are matched; and
    performing a garbage collection operation in response to determining that the LR vector and the LI vector are matched.

2. The method of claim 1, wherein setting a corresponding bit in the LR vector comprises applying an LR bloom filter to the fingerprint of a segment, which sets the corresponding bit to a first predetermined logical value in the LR vector.

3. The method of claim 2, wherein setting a corresponding bit in the LI vector comprises applying an LI bloom filter to the fingerprint of a segment, which sets the corresponding bit to a second predetermined logical value in the LI vector.

4. The method of claim 3, wherein the plurality of files is a set of predetermined files to be processed during an iteration of a scanning process to verify a larger set of files, wherein the set of predetermined files is determined based on an amount of system memory available for garbage collection, and wherein the LR bloom filter and the LI bloom filter are created based on the set of predetermined files.

5. The method of claim 1, wherein each of the segment trees comprises a plurality of levels of segments in a hierarchical structure, each parent segment containing a fingerprint of a child segment, and wherein the fingerprints of the segment trees are scanned in a breadth-first and top-down approach.

6. The method of claim 1, wherein in response to determining that the LR vector and the LI vector are not matched, the method further comprises:
    performing a physical scanning in one or more containers storing the segments to recover one or more missing fingerprints;
    populating the file index with the missing fingerprints.

7. The method of claim 6, further comprising, after all segment trees have been scanned, scanning a directory tree to locate one or more missing files.

8. A non-transitory machine-readable medium having instructions stored therein, which when executed by a processor, cause the processor to perform operations for verifying files for garbage collection, the operations comprising:
    scanning fingerprints of a plurality of segment trees, each segment tree representing one of a plurality of files in a filesystem namespace;
    for each of the fingerprints representing a segment, setting a corresponding bit in a live reference vector (LRV) to indicate that the segment has been referenced by a file in the filesystem namespace;
    scanning a file index mapping fingerprints to storage locations of a plurality of segments, including, for each fingerprint found in the file index, setting a corresponding bit in a live index vector (LIV) to indicate that the fingerprint exists in the file index;
    comparing the LR vector and the LI vector to determine that the LR vector and the LI vector are matched; and
    performing a garbage collection operation in response to determining that the LR vector and the LI vector are matched.

9. The machine-readable medium of claim 8, wherein setting a corresponding bit in the LR vector comprises applying an LR bloom filter to the fingerprint of a segment, which sets the corresponding bit to a first predetermined logical value in the LR vector.

10. The machine-readable medium of claim 9, wherein setting a corresponding bit in the LI vector comprises applying an LI bloom filter to the fingerprint of a segment, which sets the corresponding bit to a second predetermined logical value in the LI vector.

11. The machine-readable medium of claim 10, wherein the plurality of files is a set of predetermined files to be processed during an iteration of a scanning process to verify a larger set of files, wherein the set of predetermined files is determined based on an amount of system memory available for garbage collection, and wherein the LR bloom filter and the LI bloom filter are created based on the set of predetermined files.

12. The machine-readable medium of claim 8, wherein each of the segment trees comprises a plurality of levels of segments in a hierarchical structure, each parent segment containing a fingerprint of a child segment, and wherein the fingerprints of the segment trees are scanned in a breadth-first and top-down approach.

13. The machine-readable medium of claim 8, wherein in response to determining that the LR vector and the LI vector are not matched, the method further comprises:
performing a physical scanning in one or more containers storing the segments to recover one or more missing fingerprints;
populating the file index with the missing fingerprints.

14. The machine-readable medium of claim 13, wherein the operations further comprise, after all segment trees have been scanned, scanning a directory tree to locate one or more missing files.

15. A data processing system, comprising:
a processor; and
a memory coupled to the processor to store instructions, which when executed by the processor, cause the processor to perform operations, the operations including
scanning fingerprints of a plurality of segment trees, each segment tree representing one of a plurality of files in a filesystem namespace,
for each of the fingerprints representing a segment, setting a corresponding bit in a live reference vector (LRV) to indicate that the segment has been referenced by a file in the filesystem namespace,
scanning a file index mapping fingerprints to storage locations of a plurality of segments, including, for each fingerprint found in the file index, setting a corresponding bit in a live index vector (LIV) to indicate that the fingerprint exists in the file index,
comparing the LR vector and the LI vector to determine that the LR vector and the LI vector are matched, and
performing a garbage collection operation in response to determining that the LR vector and the LI vector are matched.

16. The system of claim 15, wherein setting a corresponding bit in the LR vector comprises applying an LR bloom filter to the fingerprint of a segment, which sets the corresponding bit to a first predetermined logical value in the LR vector.

17. The system of claim 16, wherein setting a corresponding bit in the LI vector comprises applying an LI bloom filter to the fingerprint of a segment, which sets the corresponding bit to a second predetermined logical value in the LI vector.

18. The system of claim 17, wherein the plurality of files is a set of predetermined files to be processed during an iteration of a scanning process to verify a larger set of files, wherein the set of predetermined files is determined based on an amount of system memory available for garbage collection, and wherein the LR bloom filter and the LI bloom filter are created based on the set of predetermined files.

19. The system of claim 15, wherein each of the segment trees comprises a plurality of levels of segments in a hierarchical structure, each parent segment containing a fingerprint of a child segment, and wherein the fingerprints of the segment trees are scanned in a breadth-first and top-down approach.

20. The system of claim 15, wherein in response to determining that the LR vector and the LI vector are not matched, the method further comprises:
performing a physical scanning in one or more containers storing the segments to recover one or more missing fingerprints;
populating the file index with the missing fingerprints.

21. The system of claim 20, wherein the operations further comprise, after all segment trees have been scanned, scanning a directory tree to locate one or more missing files.

* * * * *